United States Patent
Hall

(10) Patent No.: US 7,327,398 B2
(45) Date of Patent: Feb. 5, 2008

(54) 3D VECTOR METHOD OF INTER-FIELD MOTION DETECTION

(75) Inventor: Matthew Christopher Hall, Herts (GB)

(73) Assignee: Imagination Technologies Limited, Hertfordshire (GB)

( * ) Notice: Subject to any disclaimer, the term of this patent is extended or adjusted under 35 U.S.C. 154(b) by 489 days.

(21) Appl. No.: 10/413,268

(22) Filed: Apr. 14, 2003

(65) Prior Publication Data

US 2004/0119885 A1    Jun. 24, 2004

(30) Foreign Application Priority Data

Dec. 20, 2002 (GB) ................... 0229817.2

(51) Int. Cl.
*H04N 7/01*    (2006.01)
*H04N 11/20*    (2006.01)

(52) U.S. Cl. ............ 348/448; 348/441; 348/451; 348/452

(58) Field of Classification Search ......... 348/448, 348/441, 452, 451, 911; 382/300, 236; *H04N 7/01, H04N 11/20*
See application file for complete search history.

(56) References Cited

U.S. PATENT DOCUMENTS

| | | | |
|---|---|---|---|
| 4,982,280 A | | 1/1991 | Lyon et al. |
| 5,291,280 A | | 3/1994 | Faroudja et al. |
| 5,532,751 A | * | 7/1996 | Lui ............... 348/452 |
| 5,550,592 A | * | 8/1996 | Markandey et al. ...... 348/448 |
| 5,864,367 A | * | 1/1999 | Clatanoff et al. ......... 348/452 |
| 6,014,182 A | | 1/2000 | Swartz |
| 6,348,949 B1 | | 2/2002 | McVeigh |
| 6,459,455 B1 | | 10/2002 | Jiang et al. |
| 6,631,198 B1 | * | 10/2003 | Hannigan et al. ......... 382/100 |
| 6,661,464 B1 | * | 12/2003 | Kokkosoulis et al. ..... 348/448 |
| 6,757,022 B2 | * | 6/2004 | Wredenhagen et al. .... 348/452 |
| 6,859,235 B2 | * | 2/2005 | Walters ................ 348/448 |
| 2002/0105596 A1 | | 8/2002 | Selby |

FOREIGN PATENT DOCUMENTS

| | | |
|---|---|---|
| EP | 0 597 532 A1 | 5/1994 |
| EP | 0 849 939 A2 | 6/1998 |

OTHER PUBLICATIONS

International Search Report mailed May 13, 2004 in PCT International Application No. PCT/GB03/05504, 7 pages.
T. Koivunen, "Motion Detection of an Interlaced Video Signal", 8087 *IEEE Transactions on Consumer Electronics*, 40 Aug. 1994, No. 3, New York, US, pp. 753-759.

* cited by examiner

*Primary Examiner*—Trang U. Tran
(74) *Attorney, Agent, or Firm*—Flynn, Thiel, Boutell & Tanis, P.C.

(57) ABSTRACT

A method and apparatus are provided for displaying a progressive scan television signal derived from interlaced fields of a television signal. A colour space vector is derived for a current pixel and for each of at least two adjacent pixels within at least one field. A difference value between the current pixel colour space vector and each of the at least two adjacent pixel colour space vectors is then derived and used to determine whether motion is present at the current pixel. An appropriate method to derive the progressive scan image is then selected in dependence on the result of the determination.

14 Claims, 5 Drawing Sheets

3D VECTOR METHOD OF INTER-FIELD MOTION DETECTION

This invention relates to the processing of television signals, and in particular to a method and system for detecting motion (combing) between temporally adjacent even and odd fields of an interlaced television signal.

BACKGROUND TO THE INVENTION

Television systems have traditionally used an interlaced format for picture display. In this system, images are displayed on half of the available horizontal lines at a time. The system alternates between using the odd and even numbered lines for display, and therefore the vertical resolution of the system is reduced by half. Images are displayed at 50 Hz (PAL/SECAM) or 60 Hz (NTSC) with each image on half the lines being known as a field.

Progressive-scan systems aim to increase vertical resolution by displaying an entire frame (an image using all the available lines) for every field of input information. This type of display is particularly useful when a film is being shown since each image is static and can be displayed on all the lines of the display in a single field. The simplest method of allowing interlaced material to be displayed on a progressive-scan system is by weaving the two most recent temporally adjacent fields together to produce a complete frame. FIG. 1 shows how this takes place. Fields 101, 102 and 103 occur sequentially. Fields 101 and 103 contain information from odd-numbered lines and field 102 contains information from even numbered lines. Frame 104, which contains information from both odd and even numbered lines, is constructed by weaving together the information from field 101 and 102. Frame 105 is constructed by weaving together fields 102 and 103 in the same way.

Combining temporally spaced images in this way is the ideal solution for perfectly static pictures—however it can result in unpleasant visual artefacts known as combing if the images contain motion. For example, the sequence of fields in FIG. 1 would appear to the viewer as a smooth fade from a dark to light colour. However the woven frames would appear to the user as a fade with horizontal stripes across the screen, or as a 'shimmering' effect. Methods exist to reduce the visual impact of these artefacts by combining the most recent field with a reconstructed field, however such methods inevitably result in some loss of vertical resolution over woven fields.

Therefore to make the choice between weaving two existing fields together and using a reconstruction algorithm which uses both temporal and spatial interpolation it is important to detect motion between fields.

Systems exist to detect motion between fields by spotting combing patterns. Examples are found in U.S. Pat. Nos. 6,348,949, 4,982,280, 5,291,280, 6,014,182. Straightforward systems are limited in operation to finding simple magnitude differences between the pixels. They are somewhat simplistic and can be unreliable and sensitive to noise. More reliable solutions also exist but involve complex filtering and processing.

In addition many systems operate in only one dimension of colour space. Such simplifications make the system less sensitive to motion. For example if luminance differences are used, objects moving over differently coloured backgrounds with equal luminance are not detected. Examples of this situation can be found in sequences intended for young children, or animated logos, where primary colours are often used.

SUMMARY OF THE INVENTION

Preferred embodiments of the present invention provide a simple, reliable method for detecting combing patterns that is insensitive to noise and is able to operate in a number of colour-spaces. It is able to detect objects moving over backgrounds of equal luminance.

Preferred embodiments of the system operate by comparing calculated motion values for each pixel with a threshold level, above which motion is said to have occurred. Preferably a minimum number of pixels with motion values above the threshold must exist horizontally adjacent to one another for combing to be detected. Such a precaution eliminates false detection due to noise without complex filtering.

Preferably the system operates by calculating inter-field motion by plotting vertically adjacent (but temporally spaced) pixels in 3D colour space such as RGB or YUV and calculating the dot product of the difference vectors. Thus the system may operate in a number of 3D colour spaces.

Preferably the system causes a television signal to which the method is applied to switch between weaving fields together and interpolating fields to provide a 1:1 progressive scan display in dependence on the detected motion.

Preferably the system is provided in a domestic TV receiver.

In a preferred embodiment of the system and method of invention, areas of a video frame which include motion are detected so that lines missing from the current video may be reconstructed using interpolation rather than weaving in these areas, thus eliminating the combing effects which would otherwise occur.

The invention is defined in the appended claims to which reference should now be made.

BRIEF DESCRIPTION OF THE DRAWINGS

A preferred embodiment of the invention will now be described in detail by way of example with reference to the accompanying drawings in which.

Figure 1:
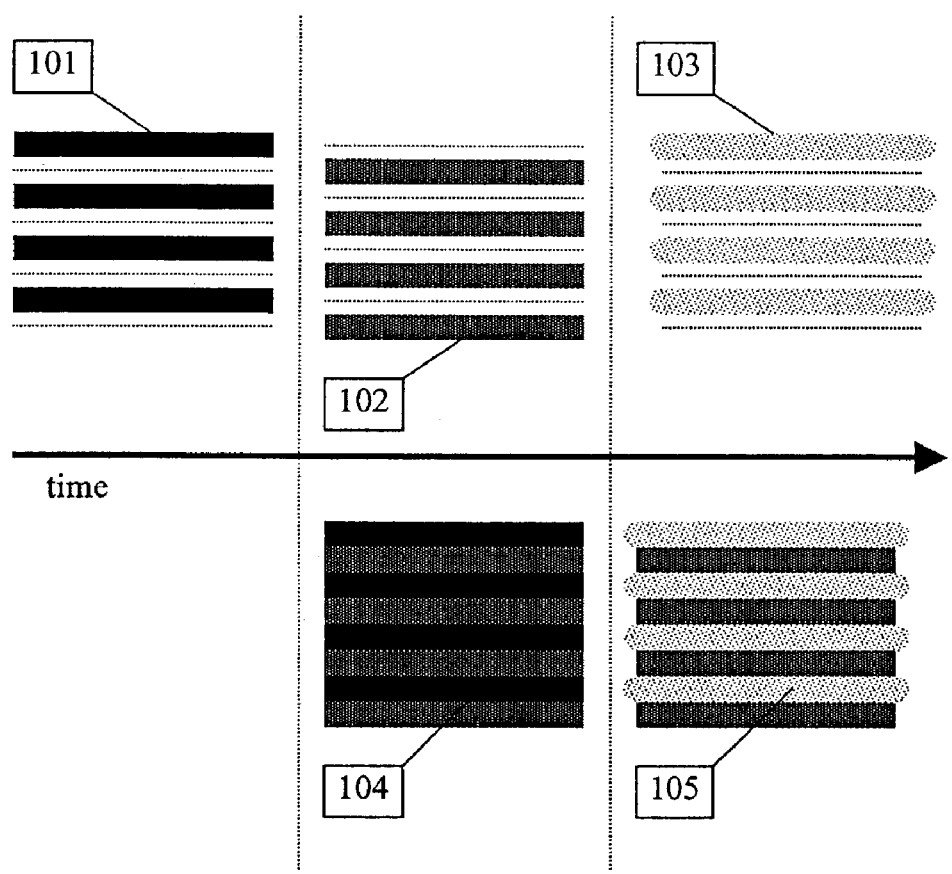
FIG. 1 is a schematic design showing how combing patterns arise, as discussed above.
Figure 2:
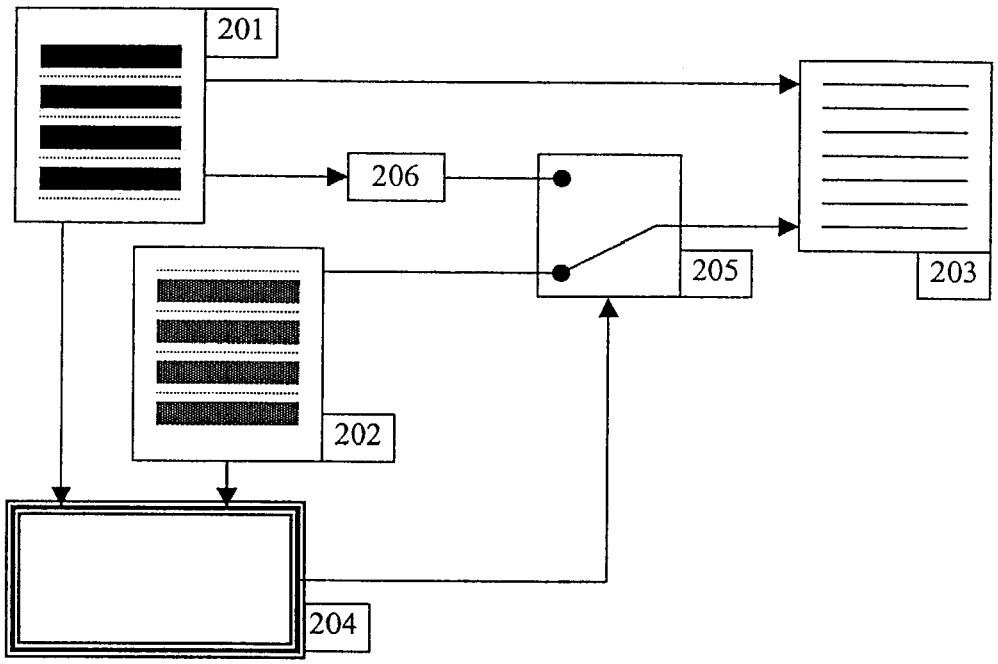
FIG. 2 shows a block diagram of an embodiment of the invention.

An embodiment of the system is shown in FIG. 2. In this, pixel information for temporally adjacent fields is stored in field stores 201 and 202. An output buffer 203 is used to contain the frame pixel information that will be sent (in a 2:1 interlace system, a frame comprises two fields). In operation, all lines from the most recently received field 201 are copied into the output buffer 203 without alteration. This leaves the pixel information for the remaining lines to be determined. A motion detection unit 204 is used to detect motion between the two fields stored in fieldstores 201 and 202 and in response to the detected motion it controls the switch 205. The motion detection unit 204 detects pixels from the lines of field 202 which are in motion, and the pixels in which no motion is present. The motion detection unit 204 controls the switch 205 to send pixel information directly from field 202 to the corresponding pixel stores in the frame 203. This gives optimum performance in the absence of motion. For the pixels in which motion is detected an interpolator 206 contained within the motion detector unit 204 operates on pixel information from the most recent field to determine an appropriate output for the required pixel in the output buffer. Switch 205 is controlled to send data from the interpolator to the output buffer 203. This eliminates combing effects in areas where motion is present.

The system could be adapted to include a more sophisticated form of interpolation, or in systems which detect motion on a field by field basis. Thus, as well as performing spatial interpolation on the basis of the most recent field stored in field store 201, temporal interpolation could also be performed using e.g. the previous and succeeding fields to the most recent field. This would give a more accurate determination of the pixel values for the interpolated lines between the lines of the field stored in field store 201. Another alternative would be to use the motion detector as a blending factor between woven pixels and interpolated pixels based on the amount of motion detected.

In a preferred embodiment of the system detects motion in pixel information from two temporally adjacent fields. This information has to exist in a format representing 3D colour space. The colour space systems that may be used include, but are not limited to, RGB and YUV. The data may exist in a compression format such as 4:2:2 without effecting the operation of the algorithm.

For ease of understanding, the information from two fields can be considered to have been woven together to form a single frame. This gives a single image where the odd numbered horizontal lines have been taken from one field and the even numbered lines from the other. This can be achieved through the use of a pixel data stream combined with a number of delay modules, or a memory module containing the pixel data. Such methods exist in the prior art and use known to those skilled in the art. Other methods may be used such that the algorithm may operate on the pixel data it requires.

Figure 3:
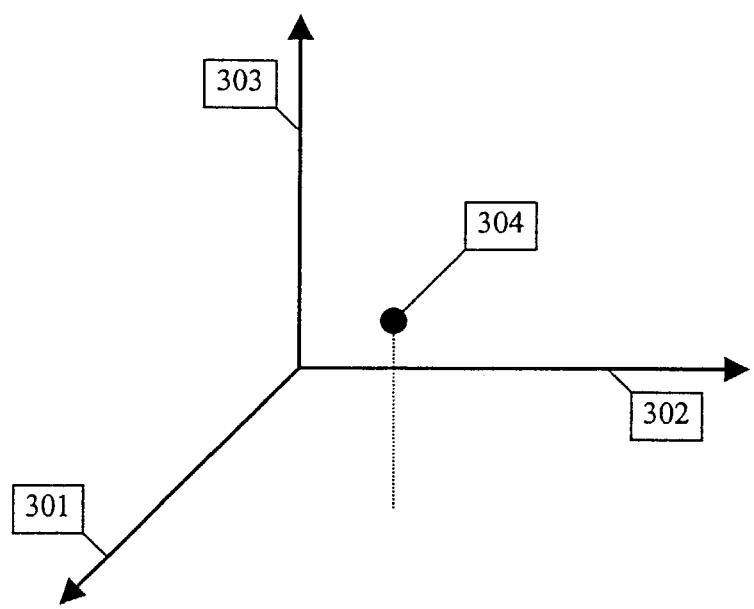
FIG. 3 shows an example of 3D colour space.

In FIG. 3, each pixel shown is considered as a point in 3D space, where its co-ordinates are defined by its colour value. In the example shown, RGB colour space is being used. Red values are plotted on axis 301, green on axis 302, and blue on axis 303.

Pixel 304 would be considered to be at point $(a_r r, a_g g, a_b b)$ where $a_r$, $a_g$ and $a_b$ indicate the red, green and blue values respectively and r, g and b are the unit vectors in the direction of the red, green and blue axes respectively. Although these unit vectors are used, other valid sets of colour space vectors could be used such as YUV.

Figure 4:
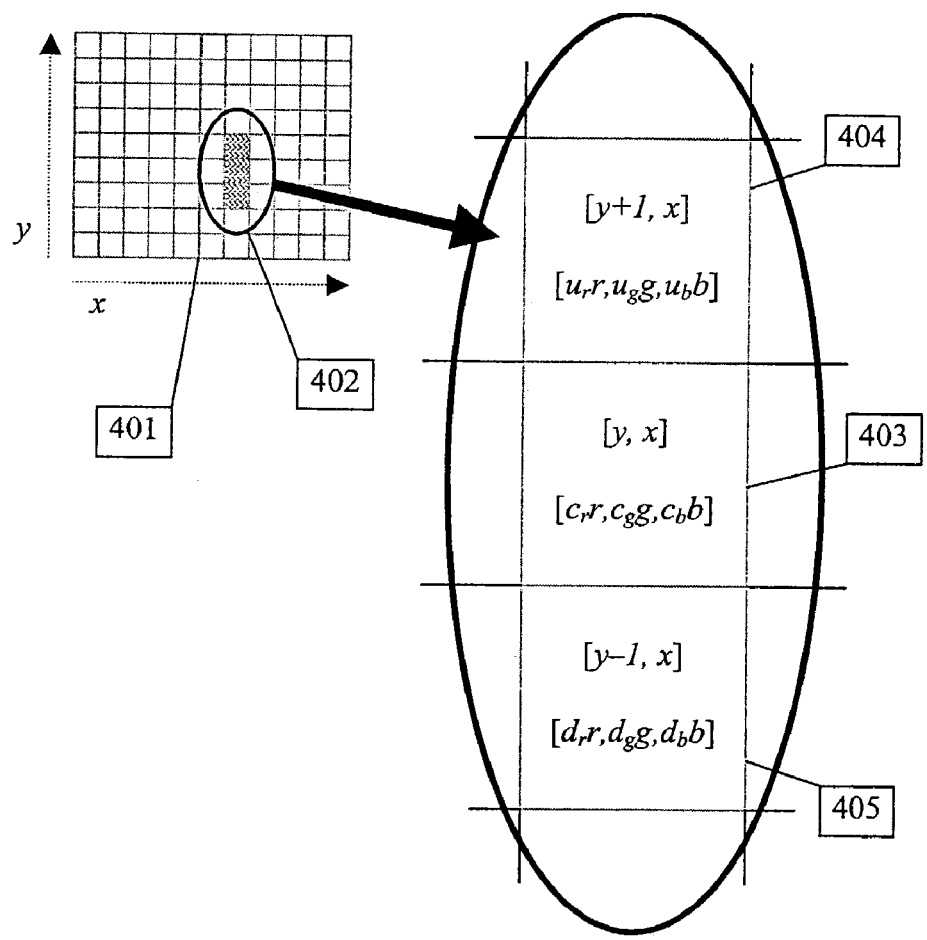
FIG. 4 shows how information from the woven frame is used to detect motion at a pixel.

FIG. 4 shows how information from woven frame 401 is used to detect motion at pixel 403. In this description, x and y indicate respectively the horizontal and vertical spatial co-ordinates of the pixel in relation to the woven image, as opposed to r, g and b which indicate the colour space unit vectors. A column of three vertically adjacent pixels, 402, is selected from the woven image. This comprises central pixel 403 at co-ordinates [x, y], the pixel vertically above, 404, at co-ordinates [x, y+1], the pixel vertically below, 405, at co-ordinates [x, y−1].

The pixel for which motion is to be detected, 403, is the 'central' pixel and has the colour space co-ordinates [$c_r$, $c_g$, $c_b$]. The pixel vertically above it ('upwards'), 404, has the co-ordinates [$u_r$, $u_g$, $u_b$], and the pixel below it ('downwards'), 405, the co-ordinates [$d_r$, $d_g$, $d_b$].

Figure 5:
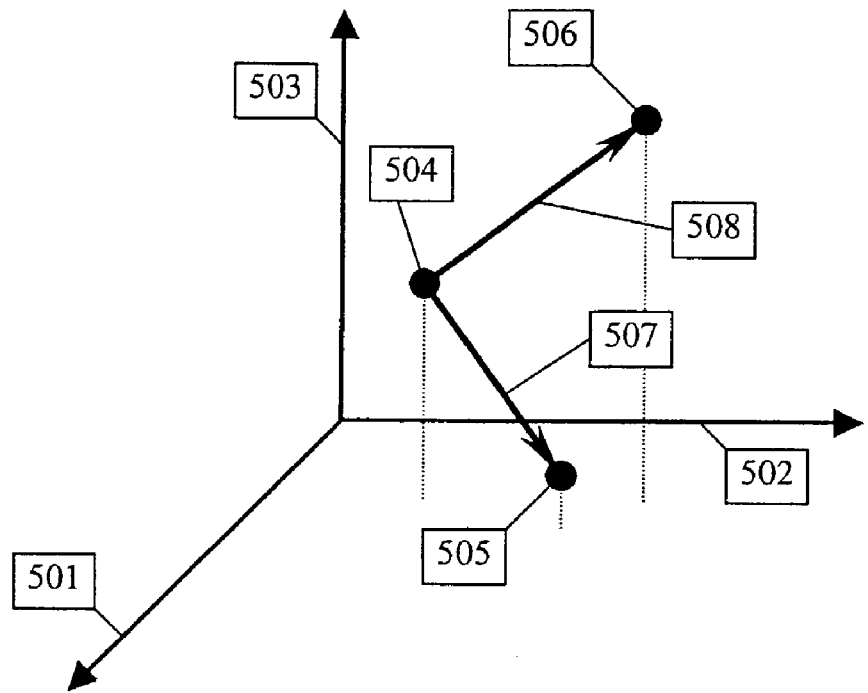
FIG. 5 shows colour space difference vectors between adjacent pixels.

The next step is to calculate the colour space difference vectors between the central pixel and the pixels vertically above and below it, as shown in FIG. 5. In this diagram, axis 501 indicates the r axis, 502 the g axis, and 503 the b axis. Point 504 indicates the position vector of the central pixel 403 when plotted in RGB colour space. Points 505 and 506 indicate the position vector of the pixels vertically above and below the central pixel when plotted in RGB colour space.

The difference vectors of interest are those between the central pixel and the pixels vertically above and below it. Difference vector 507, $D_u$, is the difference vector between the central pixel and the pixel vertically above, defined mathematically as:

$$\vec{D_u} = (d_r - c_r)\vec{r} + (d_g - c_g)\vec{g} + (d_b - c_b)\vec{b}$$

Difference vector 508, $D_d$, is the colour space difference vector between the central pixel and the pixel vertically below, defined mathematically as:

$$\vec{D_d} = (u_r - c_r)\vec{r} + (u_g - c_g)\vec{g} + (u_b - c_b)\vec{b}$$

It is important that both difference vectors are calculated in the same direction with respect to the position of the central pixel—i.e. both vectors must be pointing away from the central pixel, or both vectors must be pointing towards the central pixel.

The dot or scalar product of the two difference vectors can then be taken. This yields an inter-field motion value for the central pixel $M_{x, y}$.

$$M_{x,y} = \vec{D_u} \cdot \vec{D_d}$$

In columns of pixels where combing is present, pixels from the same field i.e. [x, y+1] and [x, y−1] are likely to share similar positions in colour space. They are also likely to be distant from the pixel from the other field i.e. [x, y]. In this case the difference vectors are likely to be closely aligned and of large magnitude, resulting in the dot product representing a high motion value. In cases of noise or high frequency vertical transitions on a static image, the vectors may either be comparatively short, or not closely aligned. Such situations can cause conventional combing systems not to function correctly. In either situation the dot product representing the motion value will be low.

The motion value calculated is compared with a threshold value, above which motion is said to have been detected for the central pixel. This threshold may be selected in dependence on the type of image being viewed, and is usually dependent on the scale of the colour space axes being used and the expected noise levels of the images being processed.

Figure 6:
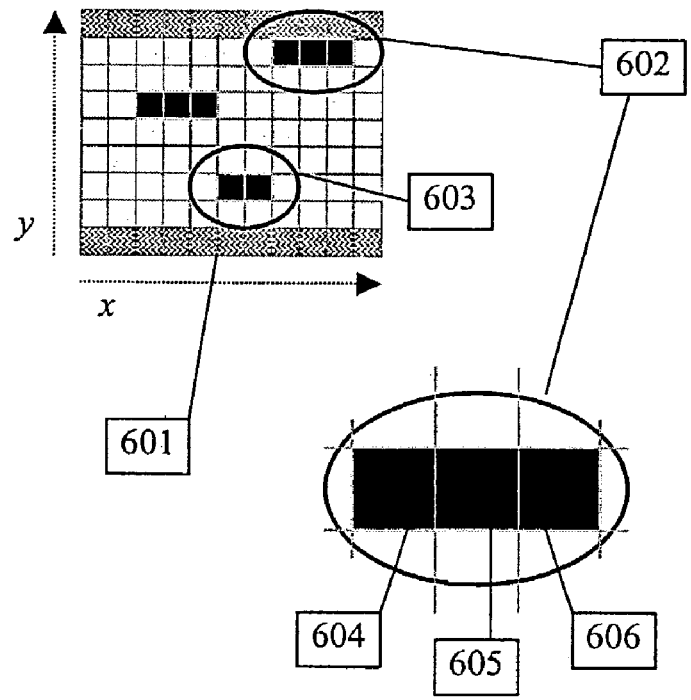
FIG. 6 shows schematically the deletion of horizontally adjacent pixels with the presence of motion.

Given the shape of the window used to decide whether a given pixel is in motion or not, it can be seen that this decision can be made for all pixels in the woven image apart from the top and bottom rows of pixels. Once a decision has been made for the valid pixels, a further condition must be fulfilled to distinguish between noise and genuine motion or 'combing'. This condition is illustrated in FIG. 6.

Matrix 601 contains the results of the motion detection decision for an arbitrary woven image. The position in the matrix corresponds to the spatial pixel co-ordinates in the woven image. If the position in the matrix is black, motion was detected at the corresponding pixel in the woven image. If the position in the matrix is white, no motion was detected in the corresponding pixel. If the position in the matrix is hatched, it was not possible to make a decision due to a lack of pixel information for the pixel above or below.

For combing to be detected, motion must have been detected in n horizontally adjacent pixels. Area 602 fulfils this requirement for n=3, as motion has been detected in three horizontally adjacent pixels. Area 603 does not fulfil this requirement for n=3 as motion has only been detected in two horizontally adjacent pixels. The horizontal combing length threshold n is constant for a given frame. Higher values of n can be used to eliminate false detection due to noise. However n is also directly related to the minimum rate of motion in the horizontal direction that can be detected by the algorithm, therefore for improved sensitivity to slow motion it is necessary to minimise n.

In systems which decide whether to weave or interpolate the output fields on a frame-by-frame basis, it is necessary to count the number of times combing is detected across a woven frame and compare the count with a threshold value, below which output fields are woven and above which interpolation takes place In systems that interpolate the output fields on a pixel-by-pixel basis, the motion value may be used to decide the method by which pixels are reconstructed; i.e. the system can switch between interlaced and non-interlaced display within a field, as will be apparent to those skilled in the art.

Figure 7:
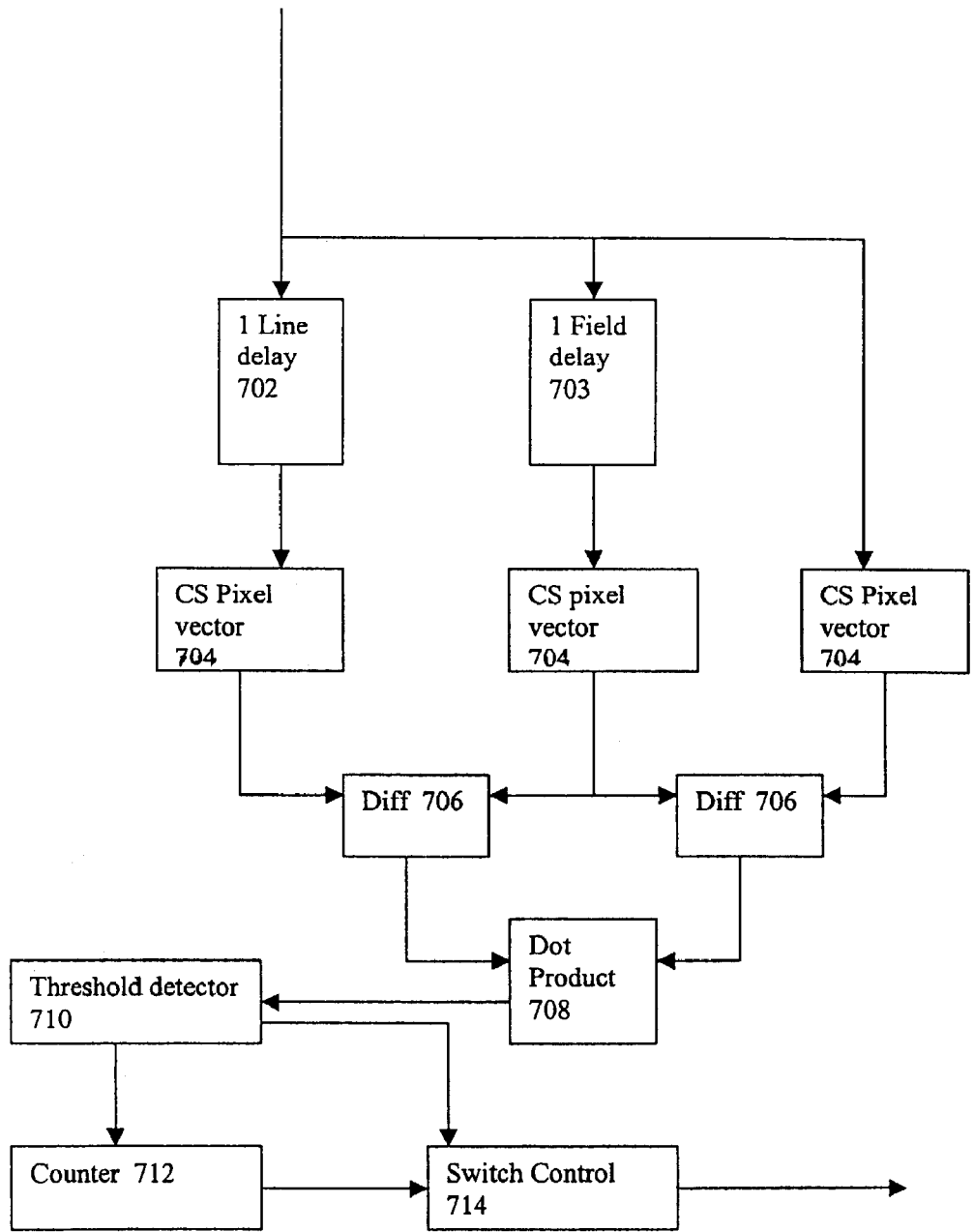
FIG. 7 shows a block diagram of the motion detection unit of FIG. 2.

FIG. 7 shows schematically an embodiment of the motion detection unit 204 of FIG. 2.

The input to the detection unit are is a continuous pixel stream representing digitised pixel information from a television signal decoder, in which pixel information is presented in the order in which it would be displayed on a standard 2:1 interlace system. The three vertically adjacent pixels are derived by using A one line delay 702 and a one field delay on the pixel stream. This then makes available the pixels vertically above and below the pixel for which motion is being detected. Alternatively, the pixels can be read into a further buffer in the motion detection unit from the field stores 201 and 202.

Colour space pixel values are derived for the three pixels in question in colour space pixel value units 704. Two difference units 706 are then used to divide difference signals between the pixels vertically above and vertically below the pixel for which motion is being detected. These difference signals then pass through a dot product deriving unit 708 which derives the dot product. A threshold detector 710 detects whether or not the dot product exceeds a pre-determined level. A counter 712 accumulates a count of the number of horizontally adjacent pixels which have exceeded the threshold and the signal from the threshold detector and the counter 712 are used by a switch control unit 714 to derive a switch control signal for the switch 205 of FIG. 2, and an interpolation enable signal for an interpolator (not shown). The switch control and interpolation enable signals then determine whether a woven or interpolated progressive scan display is provided.

It should be stressed that although this explanation has related to RGB colour space, any colour space that exists in 2 or more dimensions may be suitable for use with this method.

Due to its increased sensitivity to motion, improved noise rejection, and ability to detect motion of objects over a different coloured background with equal luminance, this solution may also be applied in the area of security monitoring. Previously, motion detection methods designed for de-interlacing applications have been unsuitable for this application and alternative methods have been used.

The invention claimed is:

1. A method for displaying a progressive-scan television signal derived from interlaced fields of a television signal, comprising the steps of:
deriving a colour space vector for a current pixel;
for each of at least two adjacent pixels from at least one adjacent field, deriving difference vectors between the current pixel colour space vector and colour space vectors for each of the at least two adjacent pixels;
determining from the difference vectors whether motion is present at the current pixel by deriving a dot product of the difference vectors and determining whether the resultant dot product value exceeds a predetermined threshold; and
selecting a method to derive the progressive scan image in dependence on the result of the determination.

2. A method according to claim 1 in which the adjacent pixels are vertically adjacent pixels.

3. A method according to claim 1 in which the determining step includes the step of determining whether motion is present on a predetermined number of adjacent pixels.

4. A method according to claim 3 in which the adjacent pixels are horizontally adjacent pixels.

5. A method according to claim 1 in which the step of selecting a method for displaying the progressive scan image selects different methods for different areas of the display.

6. A method according to claim 1 in which the step of selecting a method for display of the progressive scan image comprises selecting between an image comprising a pair of adjacent woven fields and an image comprising an interpolated image.

7. An apparatus for displaying a progressive scan television signal derived from interlaced fields of a television signal, comprising:
colour space vector deriving means for deriving a colour space vector for a current pixel and for each of at least two adjacent pixels from at least one adjacent field;
difference vector deriving means for deriving difference vectors between the current pixel colour space vector and each of the at least two adjacent colour space vectors;
motion determining means for determining from the difference vectors whether motion is present at the current pixel, comprising:
means for determining a dot product of the difference vectors, and
means for determining whether the resultant dot product value exceeds a predetermined threshold; and
method selecting means for selecting a method to derive the progressive scan image in dependence on the result of the determination.

8. Apparatus according to claim 7 in which the adjacent pixels are vertically adjacent pixels.

9. Apparatus according to claim 7 in which the motion determining means comprises means to determine whether motion is present on a predetermined number of adjacent pixels.

10. Apparatus according to claim 9 in which the adjacent pixels are horizontally adjacent pixels.

11. Apparatus according to claim 7 in which the method selecting means for selecting a method to derive the progressive scan image selects between different methods in different areas of the display.

12. Apparatus according to claim 7 in which the method selecting means selects between an image comprising a pair of adjacent fields woven together and an image comprising an interpolated image.

13. A method for detecting motion at a current pixel in one of at least two adjacent fields of an interlaced video signal, comprising the steps of:
deriving a colour space vector for the pixel;
deriving colour space vectors for at least two adjacent pixels from at least one adjacent field;
deriving difference vectors between the current pixel colour space vector and the at least two adjacent pixel colour space vectors;

determining from the difference vectors whether motion is present at the current pixel, comprising the sub-steps of deriving a dot product of the difference vectors, and determining whether the resultant dot product value exceeds a predetermined threshold; and selecting a method for deriving a progressive-scan video signal from the interlaced video signal in dependence on the determination of whether motion is present at the current pixel.

14. An apparatus for detecting motion at a current pixel in one of at least two fields of an interlaced video signal, comprising:

colour space vector deriving means for deriving a colour space vector for the current pixel and for at least two adjacent pixels from at least one adjacent field;

difference vector deriving means for deriving difference vectors between the current pixel colour space vector and the at least two adjacent colour space vectors;

motion determining means for determining from the difference vectors whether motion is present at the current pixel, including means for determining a dot product of the difference vectors and means for determining whether the resultant dot product value exceeds a predetermined threshold and method selecting means for selecting a method for deriving a progressive-scan video signal from the interlaced video in dependence on the determination of whether motion is present at the current pixel.

* * * * *